UNITED STATES PATENT OFFICE.

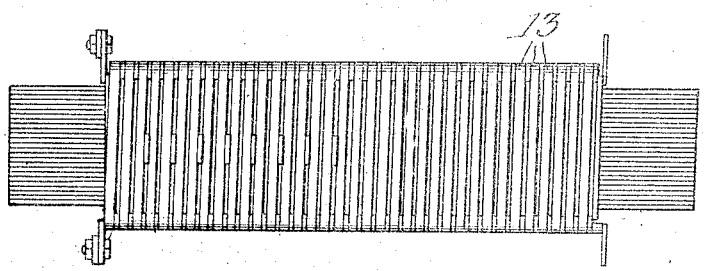
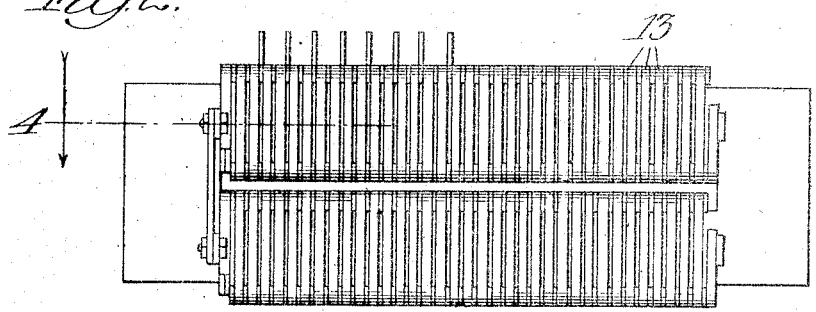
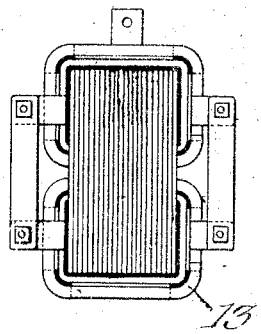
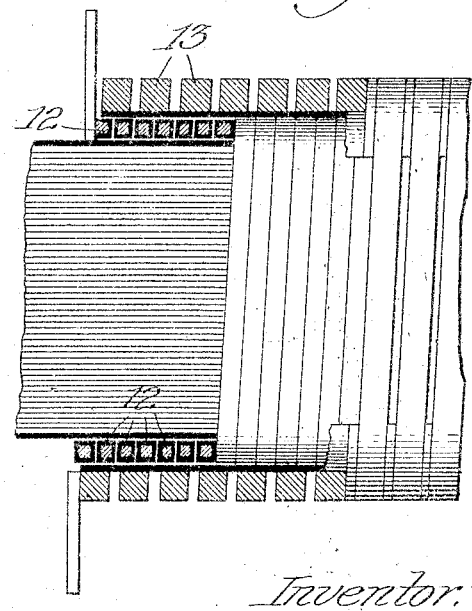

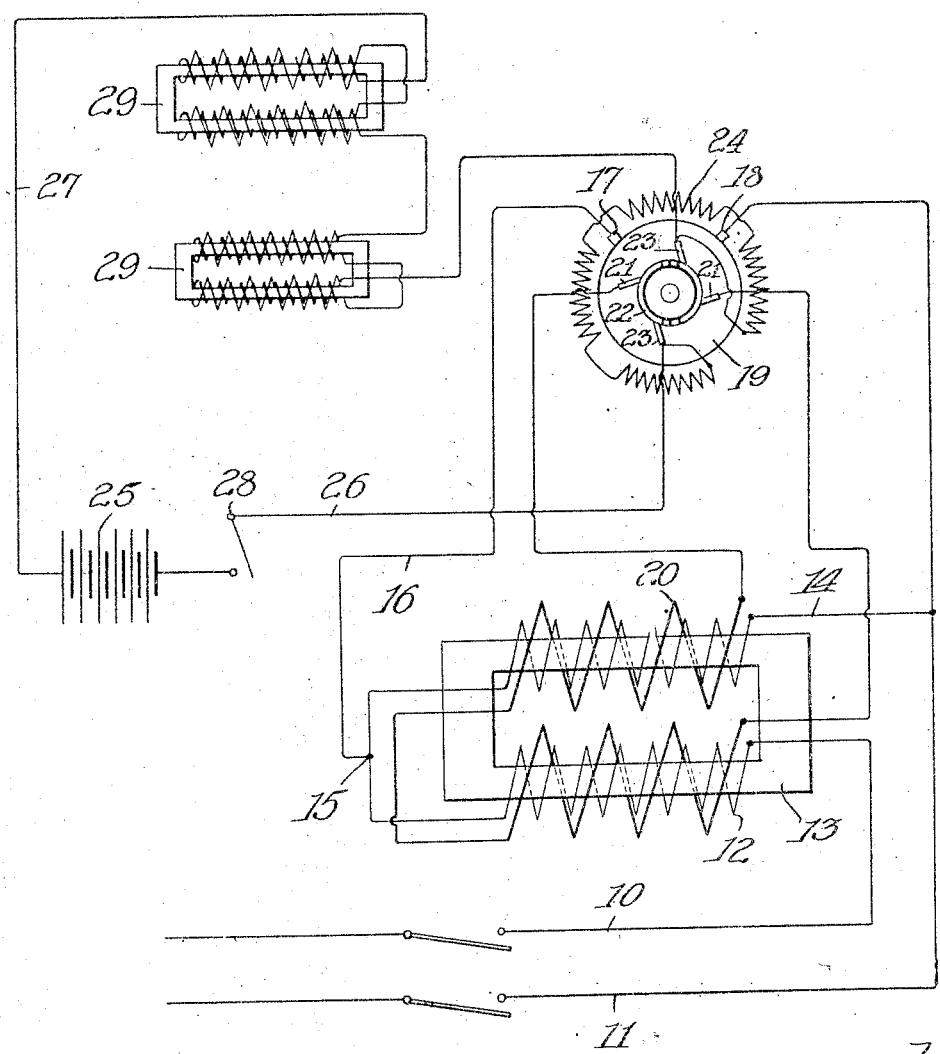

HENRY K. SANDELL, OF CHICAGO, ILLINOIS, ASSIGNOR TO HERBERT S. MILLS, OF CHICAGO, ILLINOIS.

RECTIFYING ALTERNATING CURRENTS.

1,308,448.   Specification of Letters Patent.   Patented July 1, 1919.

Application filed June 18, 1917. Serial No. 175,572.

*To all whom it may concern:*

Be it known that I, HENRY K. SANDELL, a citizen of the United States, residing at Chicago, in the county of Cook and State of Illinois, have invented a new and useful Improvement in Rectifying Alternating Currents, of which the following is a specification.

My invention relates to the art of rectifying alternating currents and particularly to a transformer especially designed for use in connection with the rectifying systems and devices described and claimed in my earlier application Numbered 100,588, filed May 29, 1916, and patented Dec. 3, 1918, as No. 1,286,795.

My present invention will be fully understood from the following detailed description of a specific embodiment thereof taken in connection with the accompanying drawings in which—

Figure 1 is a side elevation of a transformer constructed in accordance with my invention; Fig. 2 is a top plan view of the same; Fig. 3 is an end view; Fig. 4 is an enlarged broken sectional view substantially on the line 4 of Fig. 2, and Fig. 5 is a wiring diagram illustrating the essential portions of my rectifying system and the use of my transformer therein.

Referring first to the diagram (Fig. 5), the lines 10 and 11 represent the alternating current service lines, these lines in the specific embodiment of the invention shown being 220 volt lines supplied with alterating current of a frequency of 60 cycles. The line 10 is directly connected with the primary winding 12 of a closed magnetic circuit transformer 13. This primary winding being closed upon the other side of the A. C. circuit by a connection 14. At a point intermediate the length of the primary winding 12 such as the point 15, a line 16 is tapped which is connected with a brush 17, this brush in connection with a brush 18 in electrical connection with the A. C. line 11, supplying current to the slip rings of a synchronous motor designated 19. It will be observed that the primary winding 12 of the transformer 13 thus serves as an auto-transformer for the synchronous motor 19.

The secondary winding of the transformer, designated 20, is connected at its ends with alternating current brushes 21 arranged at diametrically opposite points on a rectifying commutator 22 and in coöperation with this same commutator are a pair of direct current brushes 23. The direct current field, or, in the present instance, the pulsating current field for the synchronous motor 19 is designated 24 and is shunted around the direct current brushes 23 as illustrated in the drawings.

A battery to be charged by the rectified current from the rectifier above described is designated 25 and is connected with the direct current brushes 23 by lines 26 and 27. The line 26 has interposed therein a control switch 28 while the line 27 is connected in series through two "timing coils" 29 which coils constitute the subject matter of my earlier application, Serial No. 100,588, and are fully described therein. It is sufficient for the purposes of the present invention to say that these coils which consist of transformer cores provided with single windings, are so designed that they become successively saturated with increasing current flow, both coils becoming fully saturated under a current flow substantially below the average current. I find that by this arrangement and design of the parts the commutation is very much improved.

In a system such as that above described, I have encountered many difficulties in attempting to obtain a transformer 13 capable of acting satisfactorily under the conditions of use which it meets.

In the example illustrated it was desired to obtain a transformer stepping down a primary voltage of 220 to a secondary voltage of 110, the frequency being 60 cycles and the current in the secondary 100 amperes, for use in charging a 100-volt storage battery from the rectifier 19. I find that the standard and approved transformers answering the foregoing specifications are entirely unsatisfactory for this use, and my present invention relates specifically to the provision of a transformer capable of coöperating efficiently and satisfactorily with the rectifying devices described.

Such a transformer is illustrated in Figs. 1 to 4 of the drawings. It is of the closed magnetic circuit type comprising two legs joined by end sections, the entire core being formed of laminations of silicon steel of the quality best adapted for transformer purposes. In the specific example given, each leg of the transformer is 16 inches in length and of a cross-sectional area of 8 square inches, being 2 inches in depth and 4 inches in width. The primary winding 12 consists of a single layer of square conductor aggregating 150 turns, while the secondary winding 13 likewise consists of a single layer aggregating 75 turns. In brief, it has been the purpose of my design to produce a transformer having the largest number of turns provided by the shortest possible length of conductor, the transformer further being characterized by the fact that it contains as little iron as possible. These conditions I find to be best met by the design illustrated, using relatively long legs of small cross-section wound through their entire length with a single layer of primary and a single layer of secondary.

I am of the opinion that the peculiar transformer design found by me to be essential to the efficiency of the rectifying system described is accounted for by the following characteristics of that system. In the example given, i. e., the charging of a 100-volt storage battery from rectified alternating current of a voltage of 110, it is apparent that the commutation and control must be such as to make use of only a small portion of the alternating current wave, i. e., that portion lying above the battery voltage. In the instance given this may amount to approximately ¼ of the entire wave. Now, in order to maintain an average current flow through the battery circuit of any reasonable value, it is therefore necessary that the actual current flow during the fraction of time when the circuit is closed through the commutator to the battery must be very high, approximately four times the nominal or average current. Two peculiar transformer effects would appear to result from these circumstances. In the first instance, the transformer is required to become loaded and unloaded in a time approximately ¼ of that nominally necessary as determined by the frequency of the current. In the second instance, the transformer must furnish during this exceedingly brief interval of time in which it is loaded and again unloaded, a current which over that time must have an average value of approximately 4 times the nominal current value in the charging circuit.

The foregoing considerations led me to the conclusion, the results of which are embodied in the transformer specifically described and illustrated above. This transformer I find to operate satisfactorily and efficiently in connection with the rectifying system disclosed.

What I claim as new and desire to secure by Letters Patent, is:—

1. The combination with a commutator rectifying system of a transformer for supplying alternating current to the rectifying commutator thereof, said transformer having a core member proportioned to operate at low-flux density and single turn primary and secondary windings distributed on such core member.

2. A transformer for use in a commutator rectifying system, a core member proportioned to operate at low-flux density and comprising short yoke members, relatively long leg members and single turn primary and secondary windings distributed on each leg member.

3. A closed rectangular core type transformer having leg members and yoke members, the leg member being more than twice the length of the yoke members, measured along the sides of the window and the cross section of the leg members being eight square inches, and single turn primary and secondary windings distributed throughout the length of each leg member.

HENRY K. SANDELL.